United States Patent [19]

Shinohara

[11] Patent Number: 4,762,408
[45] Date of Patent: Aug. 9, 1988

[54] PROGRESSIVE MULTIFOCAL LENS AND SPECTACLES USING SAME

[75] Inventor: Toshihide Shinohara, Suwa, Japan

[73] Assignee: Seiko Epson Corporation, Tokyo, Japan

[21] Appl. No.: 880,515

[22] Filed: Jun. 30, 1986

[30] Foreign Application Priority Data

Jul. 9, 1985 [JP] Japan .................... 60-150512

[51] Int. Cl.$^4$ .................................. G02C 7/06
[52] U.S. Cl. ........................ 351/169; 351/168
[58] Field of Search ............... 351/168, 169, 159

[56] References Cited

U.S. PATENT DOCUMENTS 4,537,479  8/1985  Shinohara et al. .................. 351/169

Primary Examiner—John K. Corbin
Assistant Examiner—Ronald M. Kachmarik
Attorney, Agent, or Firm—Blum Kaplan

[57] ABSTRACT

Progressive multifocal ophthalmic lenses are provided having a far vision viewing zone, a near vision viewing zone and an intermediate vision viewing zone therebetween. A central basic curve extends essentially vertically through the far, intermediate and near vision viewing zones. The sizes of the zones and configuration of the zones are set by predetermined conditions and equations. The construction provides improved lenses for use especially where intermediate and near vision viewing is required.

13 Claims, 5 Drawing Sheets

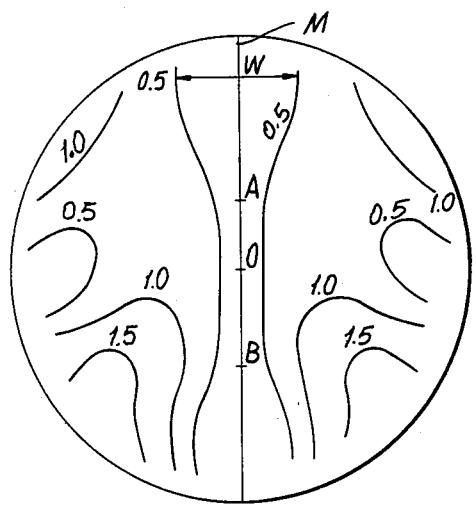
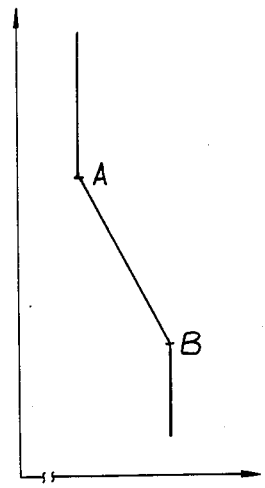
FIG. 1A          FIG. 1B
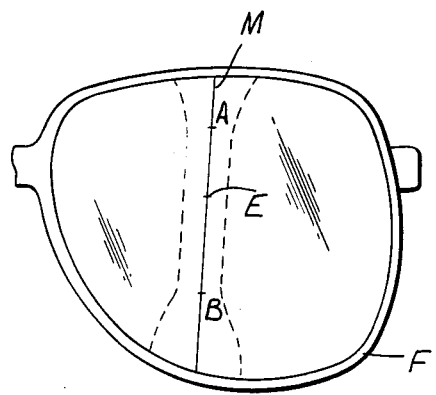
FIG. 1C

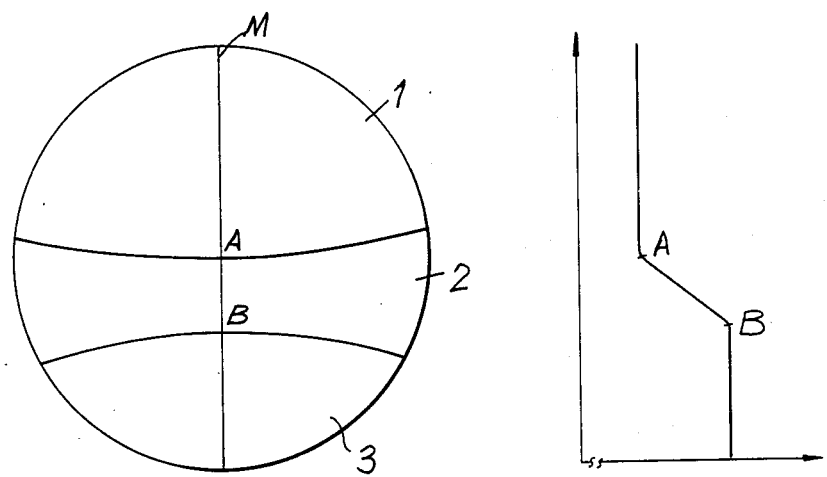
FIG.2
PRIOR ART
FIG.3
PRIOR ART
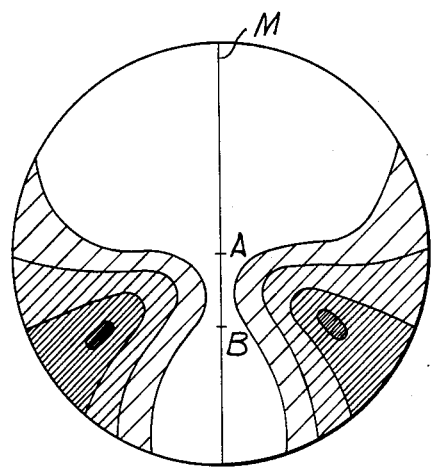
FIG.4
PRIOR ART

PROGRESSIVE MULTIFOCAL LENS AND SPECTACLES USING SAME

BACKGROUND OF THE INVENTION

The present invention relates generally to progressive multifocal ophthalmic lenses and, in particular, to a new construction for the refractive surface of a progressive multifocal lens for use preferably by an older person. As a person grows older, the amplitude of accommodation of the eyes becomes weakened. The present invention provides lenses which compensate for the weakened eye condition, such as presbyopia, and also provides spectacles utilizing such progressive multifocal lenses.

Conventional progressive multifocal opthalmic lenses are disclosed in Maitenaz U.S. Pat. No. 3,910,691 issued on Oct. 7, 1975 and in Winthrop U.S. Pat. No. 4,062,629 issued on Dec. 13, 1977. A progressive multifocal ophthalmic lens generally includes a portion for viewing distant objects at the upper position of the lens and a portion for viewing nearby objects at the lower position of the lens. An intermediate section is presented between the upper and lower portions. The three portions are known generally as the far vision viewing zone, the near vision viewing zone and the intermediate vision viewing zone. The zones are generally divided into left and right parts by a principal meridian curve which generally extends vertically. In at least the intermediate zone, the surface power varies progressively. The demarcations of each vision viewing zone are made to be smooth so that changes from one zone to the other by the eye are not perceived by the wearer of the lens.

It is desired to provide an improved progressive multifocal lens and spectacles using same which achieve each of the objects, benefits and advantages detailed below.

SUMMARY OF THE INVENTION

Generally speaking, in accordance with the present invention, a progressive multifocal ophthalmic lens is provided. The lens includes first and second refraction surfaces with the first refractive surface having a central basic curve defined thereon which extends essentially vertically therealong and divides the first refractive surface into a left portion and a right portion. The lens further includes a far vision viewing zone in an upper portion thereof for viewing mainly distant objects, a near vision viewing zone in a lower portion thereof for viewing mainly nearby objects, and an intermediate vision viewing zone for viewing mainly intermediate objects between the far and near vision viewing zones. The far vision viewing zone and the near vision viewing zone each have an optical center. A predetermined additional power is added between the optical center of the far vision viewing zone and the optical center of the near vision viewing zone along the central basic curve. The gradient G of the focal power variation between the optical center of the far vision viewing zone and the optical center of the near vision viewing zone satisfies the condition:

$$G \leq ADD/20 \text{ (diopter/mm)},$$

where ADD is the additional power in units of diopters.

The far vision viewing zone in the portion above the optical center thereof includes a clear vision viewing zone which includes the central basic curve which is defined by the condition:

$$(n-1) \times |C1 - C2| \leq 0.5 \text{ } (m^{-1}),$$

where n is the refractive index of the lens material, and C1 and C2 are the principal curvatures at each point on the refractive surface of the lens, and wherein the measurements are expressed in units of $m^{-1} = 1/\text{meter}$.

The maximum width W (mm) of the clear vision viewing zone satisfies the condition:

$$5 \leq W \leq 30 \text{ (mm)}.$$

The present invention provides an improved progressive multifocal lens in which a gradient of the additional power variation along the central basic curve of the progressive multifocal lens is enough to be easy, the astigmatism on the central basic curve is minimized, the clear vision viewing zone (the zone in which the astigmatism is 0.5 diopter or less) in the far vision viewing zone is much smaller than that of the lens in the prior art, thereby having a wide and comfortable visual zone in the intermediate vision viewing zone thereof and reducing the shaking of images therethrough. The present invention also provides improved spectacles using the lenses according to the present invention in which the lenses are set in a frame so that the eye point is on the central basic curve and at a point 5 mm to 15 mm apart from the optical center of the far zone toward the optical center of the near zone and which are suitable for tasks viewing the intermediate distanced objects or near objects.

Accordingly, it is an object of the present invention to provide improved progressive multifocal ophthalmic lenses.

Another object of the present invention is to provide a progressive multifocal ophthalmic lens for use by older people wherein the amplitude of accommodation of the eyes has become weakened.

A still further object of the present invention is to provide improved progressive multifocal ophthalmic lenses and spectacles using same.

Yet another object of the present invention is to provide an improved progressive multifocal ophthalmic lens in which various defects are eliminated and which is suitable for tasks wherein intermediate and near vision viewing is more important.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the folowing description taken in connection with the accompanying drawings, in which:

FIG. 1A depicts the distribution of astigmatism in a progressive multifocal ophthalmic lens constructed in accordance with a first embodiment of the present invention;

FIG. 1B is a graph depicting the focal power variation along the central basic curve of a lens constructed in accordance with a first embodiment of the present invention;

FIG. 1C is a front plan view of a portion of a pair of spectacles which incorporate the progressive multifocal lens constructed in accordance with a first embodiment of the present invention;

FIG. 2 is a schematic front plan view of a progressive multifocal lens constructed in accordance with the prior art for use in explaining the zones thereof;

FIG. 3 is a graph showing the focal power variation along the central basic curve of a conventional progressive multifocal ophthalmic lens;

FIGS. 4 and 5 are schematic plan views of progressive multifocal lens in the prior art showing the distribution of astigmatism therein;

DESCRIPTION OF THE PREFERRED EMBODIMENTS

Figure 5:
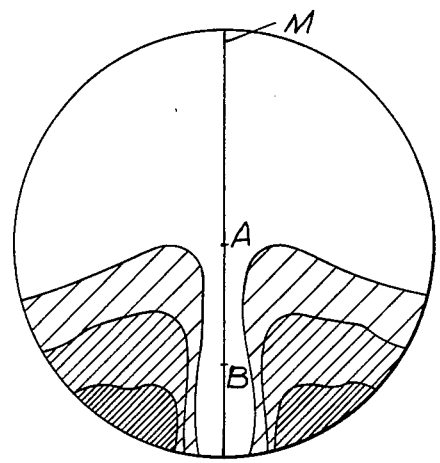

Progressive multifocal ophthalmic lenses were developed in order to compensate for the weakened function to control the crystalline lens of eyes of the aged. The fundamental structure of such lenses is first described.

Progressive multifocal lenses are formed of a pair of refractive surfaces including a convex surface and a concave surface. The convex surface has a surface power which is different partially and which provides the focal power of lenses which is suitable for viewing from far objects to near objects. The concave surface corrects nearsightedness, farsightedness, astigmatism and the like according to the prescription for each wearer's eyes. It is possible to form lenses in which the function of the convex surface and that of the concave surface are exchanged. However, the lenses of the structure as described above are generally produced because of the ease of manufacture and the like.

Additionally, the convex lens surface is roughly divided into zones as shown in FIG. 2 of the drawings provided to help in understanding the structure of such lenses.

In FIG. 2, the lens is shown as including a far vision viewing zone or far zone 1, an intermediate vision viewing zone or intermediate zone 2, and a near vision viewing zone or near zone 3, each having respective focal powers suitable for viewing far objects (about 1 m, 2 m or more away), intermediate objects (between 50 cm and 1 m or 2 m away) and near objects (less than 50 cm away), respectively. The lens includes a central basic curve M, which extends from top to bottom in the general center of the lens and divides the lens into right and left portions. If the central basic curve divides the lens into these two portions symmetrically, it is sometimes called "the principal meridian curve", and if not, it is sometimes called "the principal grazing line". The central basic curve plays very important roles in the structure of the refractive surface of progressive multifocal lenses. The focal power (or more accurately the surface power) varies along the central basic curve as shown in FIG. 3, thus providing the fundamental function of the progressive multifocal lens.

In FIG. 3, the ordinate shows the point along the central basic curve and the abscissa shows the focal power. As is clear from the graph of FIG. 3, the focal power increases gradually from the point A to the point B (FIG. 2), while it is substantially constant or changes very little in the regions above point A and below point B. The turning points A and B of the focal power variation are called the optical centers of the far zone and the near zone, respectively.

As shown in FIG. 2, the portion above point A is called the far zone, the portion below point B is called the near zone, and the portion between A and B is called the intermediate zone. Since the focal power varies continuously on the refractive surface of the progressive multifocal lens, it is impossible to clearly divide the lens surface into three portions as mentioned above. However, the conception of dividing the lens surface into three zones is generally used to facilitate understanding the structure of the lens.

The increment of the focal power added between the optical center of the far zone and the optical center of the near zone is called the additional power. The additional power is generally selected from a value between 0.5 diopter (hereinafter referred to as "D") for the slight or mild presbyopia and 3.5 D for the severe presbyopia.

The focal power on the surface of the lens, that is, the surface focal power S has the following relation with the curvature C (in units $m^{-1} = 1/\text{meter}$) of the surface of lens:

$$S = (n-1) \times C \text{ (diopter)},$$

wherein n is a refractive index of lens materials. As a refractive index of lens material is constant, the curvature is proportionate to the surface focal power. Accordingly, FIG. 3 may well be regarded to show the curvature variation along the central basic curve. As the curvature varies along the central basic curve extending generally on the center line of the lens, the configuration of the convex surface of the progressive multifocal lens is aspherical in the region from the far zone to the near zone. Hence, the curvature at a point on the lens surface varies with the direction thereof. Then, the difference of the surface power as shown by the following formula is represented at a point of the surface of the lens in proportion to the difference between the maximum curvature C1 and the minimum curvature C2 (referred to as the principal curvatures):

$$(n-1) \times |C1-C2| \text{ (diopter)}$$

This difference of the curvature appears as the astigmatism in terms of the optical properties of a lens. In the present description, the astigmatism means the difference of the surface focal power. FIG. 4 shows the distribution of the astigmatism on the progressive multifocal lens of the prior art. In FIG. 4, the astigmatism is shown by lines of the same astigmatism strength just like contour lines on a map and the narrower a space between hatched lines is, the larger the astigmatism is. The minimum astigmatism contour line shows 0.5 D and the white region shows that the astigmatism is less than 0.5 D. The region with the astigmatism of less than 0.5 D is referred to as the clear zone through which a wearer can see objects without perceiving the blurring of images. Herein, the clear zone is defined correctly as follows:

$$(n-1) \times |C1-C2| \leq 0.5 \ (m^{-1}),$$

wherein C1 and C2 stand for the principal curvatures in units of $m^{-1}$ at each point on the refractive surface in the clear zone and n is the refractive index of lens materials.

In FIG. 4, M, A and B correspond to those of FIG. 2 and show the central basic curve, the optical center of the far zone, and the optical center of the near zone, respectively. The progressive multifocal lens presents large astigmatism in the lateral portion, especially in the lateral portion in the intermediate zone and the near zone of the lens as shown in FIG. 4. This astigmatism is perceived as the blurring of images when looking at some object therethrough and also the images are distorted, thereby causing the shaking of the images when the wearer moves his head. Thus, the wearer feels uncomfortable because of the astigmatism. Therefore, it is desired to remove the astigmatism, but it is impossible to completely do so in view of the fundamental structure of the progressive multifocal lens. That is, when the astigmatism is removed by forming the far zone and the near zone to be fully spherical, the intermediate zone lying smoothly between the far zone and the near zone is obliged to be transformed remarkably, thereby causing large astigmatism in the intermediate zone. When the astigmatism is scattered over the lateral portion by making the clear zone in the far zone and near zone to be narrow, the astigmatism in the intermediate zone is reduced and the field of vision is expanded and the shaking of images is reduced in the intermediate zone, but the viewing quality through the far zone and the near zone is deteriorated. Since all progressive multifocal lenses necessarily have this inherent defect, i.e., astigmatism, it is necessary to design lenses so as to reduce defects caused by the astigmatism as much as possible according to the use of an individual wearer. From this point of view, the progressive multifocal lenses which have developed so far are roughly classified into two types as shown in FIGS. 4 and 5.

FIG. 4 shows the distribution of astigmatism of the progressive multifocal lens of the prior art in which the far vision viewing and the near vision viewing are equally considered to be important. The length between A and B in which the additional power is added along the central basic curve is normally 12 to 16 mm (a section between A and B is referred to as the progressive zone and the length thereof is referred to as the length of the progressive zone). This length of the progressive zone is not desired to be very long in view of the facility of rotation of the eyeball from the far vision viewing of the near vision viewing. The width of the clear zone in the far zone is at least about 40 mm in the horizontal direction, so that objects are seen clearly even when turning eyes into the lateral direction. The width of the clear zone in the near zone varies depends on the additional power and, for example, for the lens with the additional power of 2.00 D, the width of the clear zone is about 10 mm to 15 mm. The width of the clear zone in the intermediate zone is determined mainly by the gradient of the focal power variation in the progressive zone and is normally 3 mm to 5 mm for the lens with the additional power of 2.00 D.

Reference is now made to FIG. 5 which shows the distribution of the astigmatism of the progressive multifocal lens disclosed in U.S. Pat. No. 4,537,479 in which the present inventor was involved. The structure of the lens of FIG. 5 is different from that of the lens as shown in FIG. 4 since the lens of FIG. 5 is designed considering the far vision viewing and the intermediate vision viewing to be more important. That is, in the lens of FIG. 5, by providing the long progressive zone of 18 mm or more reducing the gradient of the focal power variation, the clear zone in the intermediate zone is made wide, and the clear zone in the far zone is made wide over the lateral peripheral portion of the lens. The width in the horizontal direction of the clear zone in the near zone is a little wider than that in the intermediate zone.

Thus, these two types of lenses, namely, the standard type lens in which both of the far vision viewing and the near vision viewing are considered more important and the zones in the whole lens are well balanced as shown in FIG. 4 (hereinafter referred to as the standard type) and the lens in which the far zone and the intermediate zone are considered more important as shown in FIG. 5 (hereinafter referred to as the far and intermediate type), are those utilized according to the use in the prior art.

Spectacles or eyeglasses using such progressive multifocal lenses are now described.

In manufacturing spectacles, a circular lens as shown in FIG. 4 is cut into the configuration of the frames of the spectacles and put into frames. At this time, the lens must be set so that the eye point is on the proper position. The eye point is a point of the lens through which the line of vision passes when the wearer looks at the far vision in a natural posture and it is also referred to as a fitting point. The eye point should be defined especially correctly in the progressive multifocal lens. As mentioned above, in the progressive lens, the power varies from point to point on the surface thereof and the distribution of the astigmatism is peculiar, and so the inherent properties of the progressive multifocal lens do not function without setting the eye point correctly.

Figure 6A:
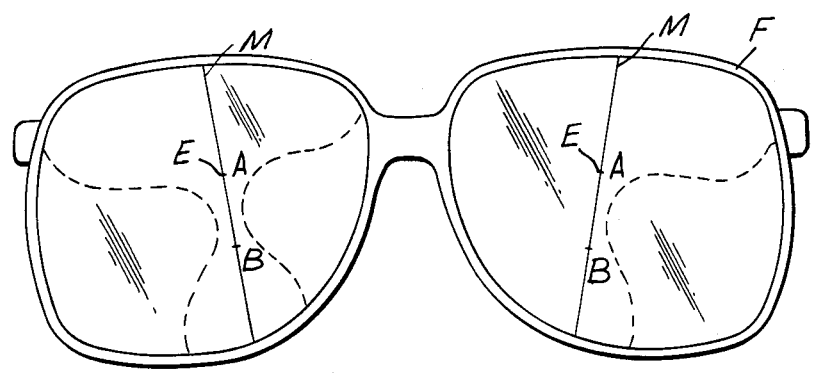
FIG. 6A is a front plan view of a pair of spectacles which incorporate progressive multifocal opthalmic lenses from the prior art wherein the spectacles are designed symmetrically with respect to the central basic curve.
Figure 6B:
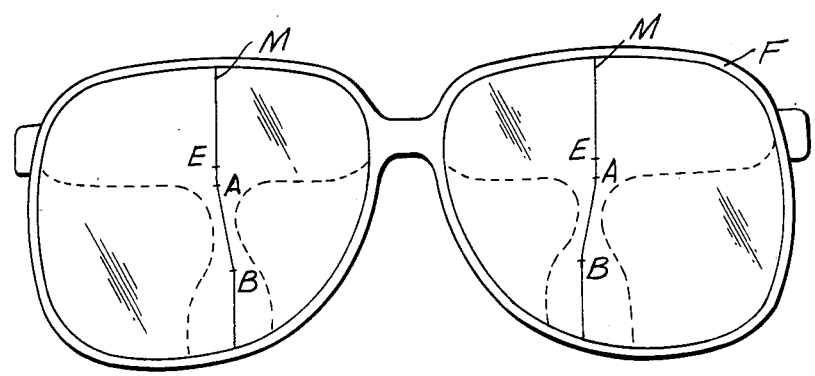
FIG. 6B is a front plan view of a pair of spectacles which incorporate progressive multifocal ophthalmic lenses from the prior art wherein the spectacles are not designed symmetrically with respect to the central basic curve.

FIGS. 6A and 6B are front plan views showing the structure of spectacles using the progressive multifocal lenses of the prior art, in which the region surrounded by a dotted line is the clear zone. In the spectacles of the type of FIGS. 6A and 6B, the eye point E is set either on the same point as the optical center of the far zone A (as shown in FIG. 6A) or at the point about 2 to 4 mm above the optical center of the far zone (as shown in FIG. 6B) of the lens. Herein, FIG. 6A illustrates an example of the spectacles in which the clear zone of the lens is symmetrical with respect to the central basic curve and the lenses are framed so as to have the central basic curve inclined by about 10° so that the optical center of the near zone is closer to the nose side than the optical center of the far zone according to the convergence of the eyeballs as shown in the drawing. FIG. 6B illustrates another example of the spectacles in which the central basic curve is previously bent in consideration of convergence of the eyeballs and in such a case, it is not necessary to incline the lenses at the time of framing. Herein, there is no relation between the symmetrization on design and the position of the eye point.

The reason for defining the eye point at the center of the far zone or the point slightly above that is that, in daily life, it is normally required for the wearer to be able to view far objects when he looks forward in a natural posture. In order to meet this requirement, the eye point is defined at the position which is in the far zone and where the rotation of eyes is not too large when viewing the near vision, i.e., near the optical center of the far zone. This feature is also applied to the far and intermediate type progressive multifocal lens.

As mentioned above, the progressive multifocal lens should be designed so as to optimally achieve the purpose of a user by eliminating problems as much as possible. In this sense, the conventional progressive multifocal lenses are less than satisfactory in use in the tasks in which the intermediate vision viewing and the near vision viewing are mainly performed, such as writing, medical operations like surgery, machine working with tools such as a lathe and the like. The standard type lens is indeed convenient to use because the far zone and the near zone have wide clear zones and rotation of the eyes when the line of vision moves from the far vision to the near vision is small, but when the intermediate zone is narrow and especially where the additional power is over 2.5 D, the wearer feels as if he peers out through the small open space of a door and feels discomfort at the time of intermediate vision viewing. The far and the intermediate type lens, which has a very wide clear zone in the intermediate zone, wider than that of the standard type lens, provides a good vision in the far vision viewing and the intermediate vision viewing. However, in this type of lens, the near zone is far from the eye point and narrow and so the near vision viewing is inconvenient.

The present invention provides a progressive multifocal lens and spectacles using the same in which the defects as above are eliminated and which is suitable for tasks with viewing mainly the intermediate and near visions. The present inventor has studied the various factors which determine the performance of the progressive multifocal lens with respect to the progressive multifocal lens in the prior art and newly manufactured experimental lenses and the following results have been obtained.

First, in order to obtain a lens which has the wide clear zone in the intermediate zone thereof and which is convenient to use, the gradient G of the additional power along the central basic curve in the intermediate zone is defined by the formula:

$$G \leq ADD/20 \text{ (diopter/mm)}$$

wherein ADD is the additional power of the lens. The smaller the gradient G in the intermediate zone is, the better, regardless of the additional power. However, as the desired additional power needs to be realized in the limited space of spectacles, the balance of the gradient G of the focal power along the central basic curve and the desired additional power is considered and as a result the above formula is obtained.

Further, in the case where the wide intermediate vision viewing is needed, such as in a surgical operation, and the additional power for the spectacles of a wearer's prescription is more than 2.5 D, the gradient G is desired to satisfy the condition:

$$G \leq ADD/25 \text{ (diopter/mm)}$$

Furthermore, in order to surely obtain the minimum visual field necessary for the far vision viewing and to reduce the astigmatism in the lateral portions of the intermediate zone, the maximum width W in the horizontal direction of the clear zone in the far vision should satisfy the condition:

$$5 \leq W \leq 30 \text{ (mm)}$$

Herein, the astigmatism is scattered into the far zone, and consequently, the astigmatism in the lateral portions of the intermediate zone is greatly reduced.

The value of W is defined within the range as depending upon the degree of the requirement for the far vision viewing and the degree of the astigmatism allowed in the lateral portions of the intermediate zone. The wearing tests for the present invention have shown that with respect to the lens in which a portion available for the far vision viewing is less than about 5 mm, the wearer complains about the width of the far vision, and with respect to the lens in which a portion available for the far vision viewing is more than about 30 mm, the wearer complains about the blurring and shaking of images in the visual field through the lateral portions of the intermediate zone.

Especially, when the wide visual field from far to near is required, it is effective to provide the astigmatism of 0.2 to 0.3 D which has the maximum focal power into the horizontal direction along the central basic curve in the far zone. Namely, by scattering the astigmatism in the far zone even over the central basic curve, the astigmatism in the intermediate zone is significantly reduced. Moreover, such a degree of the astigmatism as 0.2 to 0.3 D hardly makes a wearer feel the blurring of images when viewing distant objects.

Also, when the shaking of images through the intermediate zone is to be reduced, it has been proved to be necessary to provide certain conditions between each clear viewing zone in the far zone, the intermediate zone, and the near zone. Namely, it is effective to design so that the maximum width in the horizontal direction of the clear zone in the far zone and that in the near zone do not exceed four times the minimum width of clear zone in the intermediate zone. By satisfying this condition, the distribution of the astigmatism in the lateral portions from the far zone to the intermediate zone and to the near zone becomes smooth and changes easily, and the shaking of images is reduced. The above mentioned ratio of the width of the clear viewing zones is allowed to be large as regards the lens of the small additional power through which the shaking of images is primarily small. However, as regards the lens of the large additional power more than 2.5 D, the ratio is preferably less than three times.

Thereafter, utilizing these progressive multifocal lenses, the spectacles were made so that the eye point was at the point 5 to 15 mm lower than the optical center of the far zone along the central basic curve. By designing the spectacles as above, the power of lenses is suitable to the wearer's eyes when he views the intermediate objects in front of his face and accordingly the spectacles are convenient to see the intermediate vision.

In the progressive multifocal lens according to the present invention, the gradient of the focal power variation on the central basic curve is made small and so the distance between the optical centers of the far zone and of the near zone is long. In such a case, if the eye point is at the position as in the prior art, the near zone must be in an extremely low portion of the lens, thereby making it considerably difficult to view the near vision. However, the lens with the eye point located as mentioned above in the present invention allows the wearer to view the near vision only if he puts the line of vision downward as he does with the progressive multifocal lenses in the prior art.

Herein, the location of the eye point is determined according to the necessity of the far vision viewing; the more the necessity thereof is, the nearer to the optical center of the far zone the eye point should be.

The progressive multifocal lens according to the present invention is described in detail with reference to several embodiments.

FIGS. 1A and 1B depict the distribution of astigmatism and the variation of the focal power along the central basic curve, respectively, of the first embodiment of the progressive multifocal lens according to the present invention.

In FIG. 1A, M is the central basic curve, A is the optical center of the far zone, and B is the optical center of the near zone. The numerals in FIG. 1A show the astigmatism of each contour line in units of diopter. This embodiment is directed to the lens with the additional power of 2.0 D, in which the optical center A of the far zone and the optical center B of the near zone are at the points 10 mm above and 15 mm below, respectively, the geometric center 0 of the lens.

The focal power in the progressive portion varies approximately linearly along the central basic curve M as shown in FIG. 1B and the gradient G of the focal power variation is expressed by the formula:

$$G = 2.0/25 = 0.08 \text{ (D/mm)}$$

In the embodiments of the present invention disclosed hereinafter, the focal power variation is approximately linear, so the description thereof is omitted. The astigmatism on the central curve is zero. That is, the central basic curve is the umbilical curve. The maximum width W in the horizontal direction in the far zone is about 18 mm.

Figure 10:
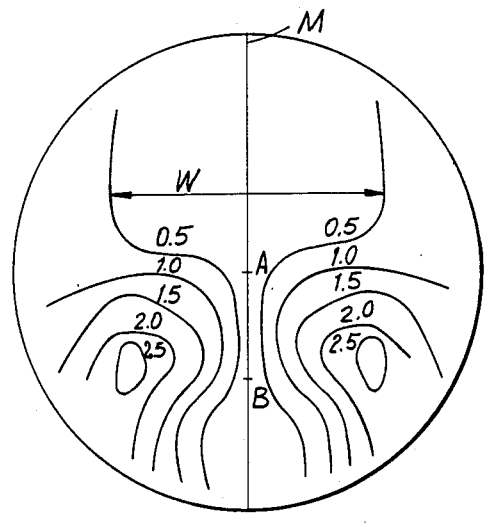
FIG. 10 is a schematic plan view illustrating the distribution of astigmatism of a progressive multifocal ophthalmic lens constructed in accordance with the prior art.

FIG. 10 shows the distribution of the prior art progressive multifocal lens for comparison with the lens of FIG. 1A according to the present invention. The lens of FIG. 10 has the additional power of 2.0 D and the progressive zones as long as 16 mm in which the focal power variation is almost linear. Accordingly, the gradient G of the focal power variation in the progressive zone satisfies the equation $G = 2.0/16 = 0.125$ (D/mm). The astigmatism on the central basic curve is zero and the maximum width W in the horizontal direction of the far zone is 42 mm. The maximum width in the horizontal direction of the clear zone in the near zone is about 12 mm in both lenses of FIG. 1A and FIG. 10.

The progressive multifocal lens according to the present invention is characterized in that the gradient of the focal power variation along the central basic curve in the progressive portion is far smaller and the maximum width in the horizontal direction of the clear zone in the far zone is even smaller compared with the prior art lens mentioned above. The effect of the characteristic is reflected on the intermediate zone. Namely, as is clear by comparing FIG. 1A with FIG. 10, the astigmatism in the intermediate zone is significantly smaller in the lens according to the present invention than that in the prior art lens. Comparing the width in the horizontal direction of the clear zone of the intermediate zone between the lenses in FIG. 1A and FIG. 10, that of the lens according to the present invention is about 7 mm and is approximately 40% larger than that in the prior art lens. Also, with respect to the astigmatism in the lateral portions from the intermediate zone to the near zone of the lens, that of the prior art lens is 2.5 D while that of the lens according to the present invention is only 1.5 D. Accordingly, the present invention provides the lens through which the wearer obtains a wide field of vision without feeling like peeping out of a small space of a door. Moreover, when the wearer moves the line of vision from the intermediate zone to the near zone of the lens, the field of vision is smooth and natural.

The ratio of the widths of the clear zones in the far zone and the near zone with respect to the width of the clear zone in the intermediate zone is about 2.3 times and 1.5 times, respectively, which are extremely reduced compared with about 8.4 times and 5.4 times, respectively, of the prior art lens. This is another characteristic of the present invention. Thus, by smoothing the abrupt decrease of the width of the clear zone in the intermediate zone, the astigmatism is prevented from concentrating in the lateral portions of the intermediate zone as in the prior art lenses, and consequently the shaking of images is reduced.

Figure 7:
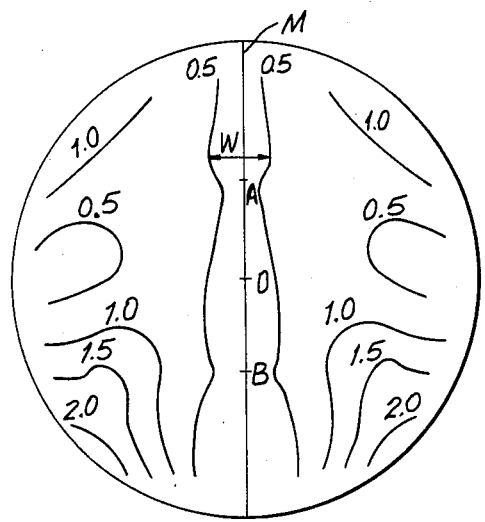
FIG. 7 is a schematic plan view illustrating the distribution of astigmatism of a progressive multifocal ophthalmic lens constructed in accordance with a second embodiment of the present invention.

FIG. 7 depicts the distribution of the astigmatism of the second embodiment of the progressive multifocal lens according to the present invention. In this embodiment, the additional power is 2.0 D as in the first embodiment, the optical center A of the far zone and the center B of the near zone are on the central basic curve 15 mm above and 15 mm below, respectively, the geometric center 0.

The maximum width W in the horizontal direction of the clear zone in the far zone is about 10 mm. There is the astigmatism partially on the central basic curve, which is different from the first embodiment. Namely, in the far zone, there is the astigmatism of 2.5 D which has the maximum focal power in the horizontal direction, and in the intermediate zone, the astigmatism decreases almost linearly form the optical center of the far zone toward the optical center of the near zone until it becomes zero at the optical center of the near zone. The maximum width of the clear zone in the near zone is about 14 mm.

In this embodiment, the gradient G of the focal power variation in the progressive zone is shown as $G = 2.0/30 = 0.067$ (D/mm) which is even smaller than that of Embodiment 1. Consequently the width in the horizontal direction of the clear zone in the intermediate zone becomes wide, thereby improving the intermediate vision viewing in terms of not only the dimension of a visual field but also the shaking of images. Furthermore, since the astigmatism is provided along the central basic curve in the far zone in this embodiment, the astigmatism as above necessarily occurs in the progressive zone, too, and the clear zone in the intermediate zone laterally expands as it becomes closer to the near zone. Accordingly, the lens of this embodiment is more convenient in that the transition of the intermediate vision viewing and the near vision viewing is smooth and comfortable.

The lenses of the second embodiment are especially designed for the use in tasks using the intermediate and near vision viewing. So, the width of the far zone is more greatly narrowed than that of Embodiment 1 so as to improve the intermediate vision viewing. The width of the clear zone in the intermediate zone is the narrowest near the optical center of the far zone and is about 5 mm, and the widest at the region 5 to 8 mm below the geometric center and is about 20 mm. Similar to the first embodiment, the ratio of the maximum width of the clear zone of the far zone and the near zone with respect to the minimum width of the clear zone of the intermediate zone is 2 times and 2.4 times, respectively and thus the decrement of the width of the clear zone in the intermediate zone is less than two-thirds of those of the far and the near zones.

Figure 8:
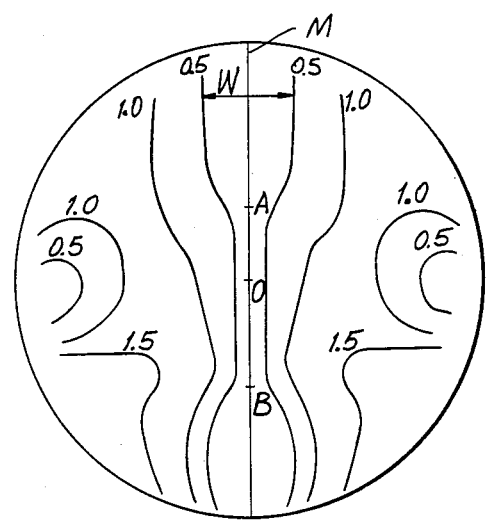
FIG. 8 is a schematic plan view depicting the distribution of astigmatism of a progressive multifocal ophthalmic lens constructed in accordance with a third embodiment of the present invention.

FIG. 8 illustrates the distribution of the astigmatism of the third embodiment of the progressive multifocal lens according to the present invention. In this Embodiment, the additional power is 2.5 D and the optical centers of the far zone and the near zone are positioned in the same locations as those of Embodiment 1. The astigmatism on the central basic curve is zero. The width W of the clear zone in the horizontal direction is the far zone is about 13 mm and the width in the near zone is about 12 mm.

Figure 11:
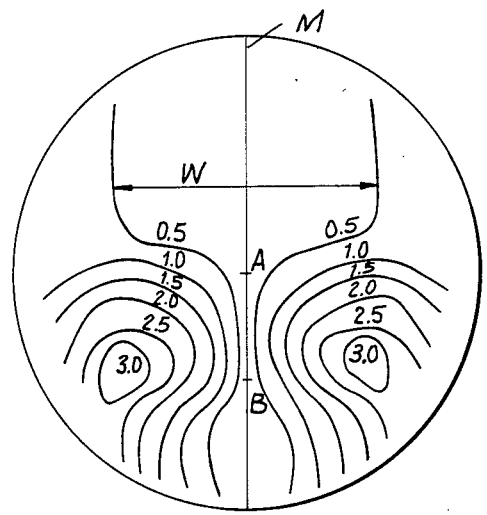
FIG. 11 is a schematic plan view depicting the distribution of astigmatism in another progressive multifocal ophthalmic lens constructed in accordance with the prior art.

FIG. 11 shows the distribution of the astigmatism of the prior art progressive multifocal lens for comparison with this embodiment. In FIG. 11, the additional power is 2.5 D, the length of the progressive zone is 16 mm, the width W of the clear zone of the far zone is 40 mm, that of the near zone is about 12 mm and the astigmatism on the central basic curve is zero.

By comparing FIG. 8 with FIG. 11, the effects of the present invention as described with respect to the lens with the additional power of 2.0 D can be reconfirmed. That is, in the prior art, the width of the clear zone in the intermediate zone is about 3.5 mm, while that of the lens of the present invention is about 5 mm and is 40% larger than in the prior art. The astigmatism of the lateral portions extending in the intermediate zone and in the near zone is 3.0 D in the prior art, while it is 1.5 D in the present invention, being greatly reduced, so that the dimension of the visual field and the shaking of the images for the intermediate zone are remarkably improved.

The ratio of the clear zone of the far zone with respect to that of the intermediate zone is about 11 times in the prior art, while about 2.6 times in the present invention. The ratio of the clear zone of the near zone with respect to that of the intermediate zone is about 3.4 times in the prior art, while 2.4 times in the present invention being reduced remarkably and the shaking of images through the intermediate zone is reduced.

Figure 9A:
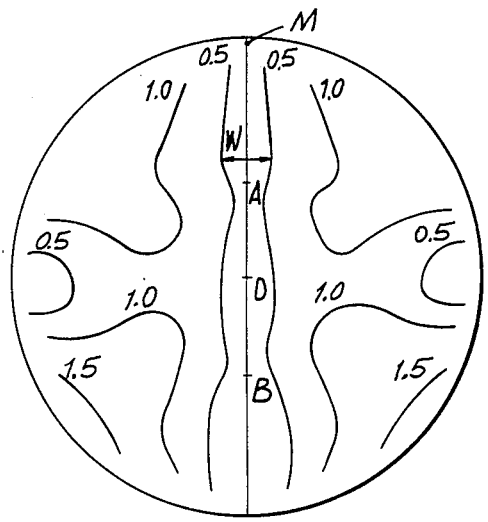
FIG. 9A is a schematic plan view depicting the distribution of astigmatism of a progressive multifocal ophthalmic lens constructed in accordance with a fourth embodiment of the present invention.

FIG. 9A shows the distribution of the astigmatism of the fourth embodiment of the progressive multifocal lens according to the present invention. The additional power of the lens is 2.5 D as in Embodiment 3 and the centers of the far zone and the near zone are positioned 15 mm above and 15 mm below the geometric center 0 of the lens respectively. The maximum width W of the clear zone in the far zone is about 8 mm and the width of the clear zone in the near zone is about 10 mm. The lens of FIG. 9A has the astigmatism on the central basic curve as in Embodiment 2 shown in FIG. 7. As is clear from comparison of FIG. 9A with FIG. 8, similar to the second and the first embodiments, as a result of the gradient of the focal power variation in the progressive zone being reduced, since the astigmatism is provided on the central basic curve in the far zone and since the width of the clear zone of the far zone is narrowed, the astigmatism in the intermediate zone is drastically reduced and the intermediate vision viewing is improved.

With reference to the configuration of the clear zone in the intermediate zone, the minimum width thereof near the optical center of the far zone is about 4 mm and the maximum width thereof a little below the geometric center is about 8 mm. Accordingly, the maximum width of the clear zone of the far zone and the near zone is about twice and 2.5 times as large as the minimum width of the clear zone of the intermediate zone, respectively, to control the shaking of images.

Next, spectacles according to the present invention are explained in detail with reference to several of the embodiments.

Figure 9B:
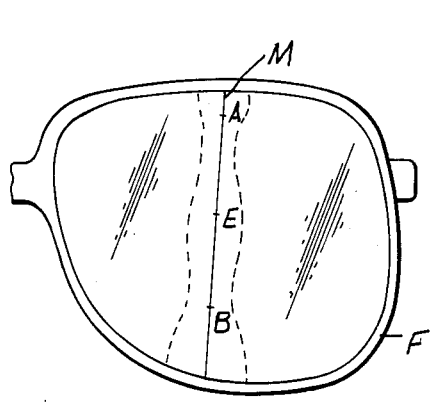
FIG. 9B is a front plan view of a portion of a pair of spectacles using the lens depicted in FIG. 9A.

FIGS. 1C and 9B show embodiments of spectacles according to the present invention. Both of these drawings are front plan views of one half of the spectacles using the progressive multifocal lenses of Embodiments 1 and 4, respectively, in which the progressive multifocal lens according to the present invention is put into frames F of spectacles. In the drawings, the region inside of the dotted lines is the clear zone of the lens. The eye point E, in FIG. 1C is 10 mm below the optical center A of the far zone and in FIG. 9B it is 15 mm below the optical center A of the far zone on the central basic curve. The characteristic of the spectacles according to the present invention is that the progressive multifocal lenses according to the present invention as described above are used and are put into frames so that the eye point is within the progressive zone, concretely at the position 5 to 15 mm below the optical center of the far zone. By the structure as above, the following features in the practical use are obtained. When the wearer of the spectacles can look forward, the focus of the lens is at the intermediate distant point from the wearer's eyes and so the wearer can view the intermediate zone comfortably by looking straight forward. When the wearer looks from straight forward to downward through lenses, he can see the near vision through the near zone as in the progressive multifocal lenses in the prior art. While, as the wearer looks upwards from straight forward, the focus of the lens moves far away, so it is capable to look at the far vision viewing through the portion above the optical center of the far zone.

Such spectacles as above are different from any others known in the prior art. The reasons are that the spectacles using the progressive multifocal lenses in the prior art are designed considering the far vision viewing to be most important and so it is necessary to set the eye point within the far zone as shown in FIGS. 6A and 6B and that the lenses in themselves in the prior art have defects of narrow visual field through the intermediate zone and of the considerable shaking of images and so the spectacles as in the present invention cannot be realized from the prior art.

Accordingly, the spectacles according to the present invention are advantageous in the tasks with viewing the intermediate and the near visions and have a feature that the wearer can look not only at near objects but also use the far vision, though it is not very wide unlike the single vision lenses for the aged people in the prior art.

As explained with reference to the embodiments, the present invention provides improved progressive multifocal lenses and spectacles using the same which are suitable for the tasks mainly with the intermediate and the near vision viewing.

The progressive multifocal lens in accordance with the present invention is designed so as to define the gradient G of the additional power variation in the intermediate zone to satisfy the condition:

$G \leq ADD/20$ (D/mm), wherein ADD is the additional power, so that the clear zone in the intermediate zone is expanded and consequently a wide and clear image is obtained for the intermediate vision viewing.

Simultaneously, by providing the astigmatism in the far zone so that the maximum width W in the horizontal direction of the clear zone in the far zone satisfies the condition $W \leq 30$ (mm), the astigmatism in the intermediate zone is further reduced and the blurring and shaking of images through the lateral portions of the intermediate zone of the lens are reduced. Additionally, the width W of the clear zone in the far zone as above is defined as $W \geq 5$ (mm) to insure the quality of the vision viewing which is necessary at the minimum.

When the gradient G of the focal power variation along the central basic curve in the intermediate zone is defined so as to satisfy the condition: $G \leq ADD/25$ (D/mm), the astigmatism in the intermediate zone is far more reduced and a very good intermediate vision viewing is obtained.

By adding the astigmatism of 0.2 to 0.3 D which has the maximum focal power nearly in the horizontal direction onto the central basic curve in the far zone, the clear zone in the intermediate zone presents the configuration which expands from the far zone side to the near zone side, and consequently it becomes especially easy to see the intermediate and near objects through the lenses.

By defining the maximum width in the horizontal direction of the clear zone in the far zone and the near zone not be be larger than 4 times of the minimum width of the clear zone in the intermediate zone, the astigmatism in the lateral portions of the lens gradually varies over the region from the far zone to the near zone and the shaking of images for the intermediate vision viewing is reduced because the astigmatism is not concentrated to the lateral portion of the intermediate zone as it is in the lenses in the prior art. The ratio of the maximum width of the clear zone of the far and the near zones with respect to the minimum width of that of the intermediate zone is preferably less than 3 times with respect to the lens whose additional power is more than 2.5 D.

The spectacles in accordance with the present invention are made of the lenses having the superior performances for the intermediate vision viewing as mentioned above and the lenses are framed so that the eye point is at the point on the central basic curve 5 mm to 15 mm away from the optical center of the far zone toward the optical center of the near zone. By this structure, the wearer can comfortably view intermediate objects when looking straight forward from the face and the spectacles are very convenient to use in tasks performed mainly with the intermediate and near vision viewing.

As mentioned above, the progressive multifocal lens and spectacles using the same which are suitable for tasks performed mainly with the intermediate and the near vision viewing are obtained according to the present invention. The features of the progressive multifocal lens and those of the spectacles are selected in combination according to the uses.

Moreover, in the embodiments of the present invention, lenses are designed symmetrically with respect to the central basic curve. However, the concept of the present invention is also applicable to the lenses which are asymmetrical laterally being designed in consideration of the convergence of the eyeball.

Moreover, the focal power variation in the progressive zone is nearly linear in all of the embodiments but it is not a necessary condition for the present invention.

Furthermore, the present invention can be applied to the progressive multifocal lenses having the progressive focal power variation on the concave refractive surface of the lens.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A progressive multifocal ophthalmic lens comprising first and second refractive surfaces, said first refractive surface having a central basic curve defined thereon which extends essentially vertically therealong and divides said first refractive surface into a left portion and a right portion, and including a far vision viewing zone in an upper portion for viewing mainly distant objects, a near vision viewing zone in a lower portion for viewing mainly nearby objects, and an intermediate vision viewing zone for viewing mainly intermediate objects between said far and near vision viewing zones, said far vision viewing zone and said near vision viewing zone each having an optical center and a clear vision viewing zone, a predetermined additional power being added between the optical center of the far vision viewing zone and the optical center of the near vision viewing zone along said central basic curve, the gradient G of the focal power variation between said optical center of the far vision viewing zone and said optical center of the near vision viewing zone satisfying the condition:

$G \leq ADD/20$ (diopter/mm), wherein ADD is said additional power in units of diopter, the far vision viewing zone in the portion above said optical center of said far vision viewing zone having said clear vision viewing zone including said central basic curve and defined by the condition:

$$(n-1) \times |C1-C2| \leq 0.5 \ (m^{-1}),$$

where n is the refractive index of the lens material, and C1 and C2 are the principal curvatures at each point on the refractive surface of the lens, and wherein $m^{-1} = 1/\text{meter}$, the maximum width W (mm) of the said clear vision viewing zone in said far vision viewing zone satisfying the condition:

$$5 \leq W \leq 30 \ (\text{mm}).$$

2. The progressive multifocal lens as claimed in claim 1, wherein said gradient G of the focal power variation satisfies the condition:

$$G \leq ADD/25 \ (\text{diopter/mm}).$$

3. The progressive multifocal lens as claimed in claim 1 wherein said principal curvatures C1 and C2 along said central basic curve in said far vision viewing zone satisfies the condition:

$$0.2 \leq (n-1) \times |C1-C2| \leq 0.3 \ (m^{-1}),$$

and the direction of the maximum curvature of said principal curvatures is nearly parallel to the horizontal direction.

4. The progressive multifocal lens as claimed in claim 2 wherein said principal curvatures C1 and C2 along said central basic curve in said far vision viewing zone satisfies the condition:

$$0.2 \leq (n=1) \times |C1-C2| \leq 0.3 \ (m^{-1}),$$

and the direction of the maximum curvature of said principal curvatures is nearly parallel to the horizontal direction.

5. The progressive multifocal lens as claimed in claim 1 wherein said intermediate vision viewing zone includes a clear vision viewing zone, and wherein the maximum width of the clear vision viewing zone in said far vision viewing zone and the maximum width of the clear vision viewing zone in said near vision viewing zone does not exceed by four times the minimum width of the clear vision viewing zone in the intermediate vision viewing zone.

6. The progressive multifocal lens as claimed in claim 2 wherein said intermediate vision viewing zone includes a clear vision viewing zone, and wherein the maximum width of the clear vision viewing zone in said far vision viewing zone and the maximum width of the clear vision viewing zone in said near vision viewing zone does not exceed by four times the minimum width of the clear vision viewing zone in the intermediate vision viewing zone.

7. Spectacles having at least one progressive multifocal lens set in a frame thereof, said progressive multifocal ophthalmic lens comprising first and second refractive surfaces, said first refractive surface having a central basic curve defined thereon which extends essentially vertically therealong and divides said first refractive surface into a left portion and a right portion, and including a far vision viewing zone in an upper portion for viewing mainly distant objects, a near vision viewing zone in a lower portion for viewing mainly nearby objects, and an intermediate vision viewing zone for viewing mainly intermediate objects between said far and near viewing zones, said far vision viewing zone and said near vision viewing zone each having an optical center and a clear vision viewing zone, a predetermined additional power being added between the optical center of the far vision viewing zone and the optical center of the near vision viewing zone along said central basic curve, the gradient G of the focal power variation between said optical center of the far vision viewing zone and said optical center of the near vision viewing zone satisfying the condition:

$$G \leq ADD/20 \ (\text{dopter/mm}),$$

wherein ADD is said additional power in units of diopter, the far vision viewing zone in the portion above said optical center of said far vision viewing zone having said clear vision viewing zone including said central basic curve and defined by the condition:

$$(n-1) \times |C1-C2| \leq 0.5 \ (m^{-1}),$$

where n is the refractive index of the lens material, and C1 and C2 are the principal curvatures at each point on the refractive surface of the lens, and wherein $m^{-1} = 1/\text{meter}$, the maximum width W (mm) of the said clear vision viewing zone in said far vision viewing zone satisfying the condition:

$$5 \leq W \leq 30 \ (\text{mm}).$$

8. The spectacles as claimed in claim 7, wherein said gradient G of the focal power variation of the lens satisfies the condition:

$$G \leq ADD/25 \ (\text{diopter/mm}).$$

9. The spectacles as claimed in claim 7, wherein the principal curvatures C1 and C2 of the lens on the central basic curve in said far vision viewing zone satisfies the condition:

$$0.2 \leq (n-1) \times |C1-C2| \leq 0.3 \ (m^{-1}),$$

and the direction of the maximum curvature of said principal curvatures is generally parallel to the horizontal direction.

10. The spectacles as claimed in claim 8, wherein the principal curvatures C1 and C2 of the lens on the central basic curve in said far vision viewing zone satisfies the condition:

$$0.2 \leq (n-1) \times |C1-C2| \leq 0.3 \ (m^{-1}),$$

and the direction of the maximum curvature of said principal curvatures is generally parallel to the horizontal direction.

11. The spectacles as claimed in claim 7, wherein said intermediate vision viewing zone includes a clear vision viewing zone, and wherein the maximum width of the clear vision viewing zone in said far vision viewing zone of the lens and the maximum width of the clear vision viewing zone in said near vision viewing zone does not exceed by four times the minimum width of the clear vision viewing zone in said intermediate vision viewing zone.

12. The spectacles as claimed in claim 8, wherein said intermediate vision viewing zone includes a clear vision viewing zone, and wherein the maximum width of the clear vision viewing zone in said far vision viewing zone of the lens and the maximum width of the clear vision viewing zone in said near vision viewing zone does not exceed by four times the minimum width of the clear vision viewing zone in said intermediate vision viewing zone.

13. The spectacles as claimed in claim 7, wherein said lenses are formed so that the eye point is on said central basic curve and at a portion 5 mm to 15 mm apart from said optical center of the far vision viewing zone toward said optical center of the near vision viewing zone.

* * * * *